Figure 3:
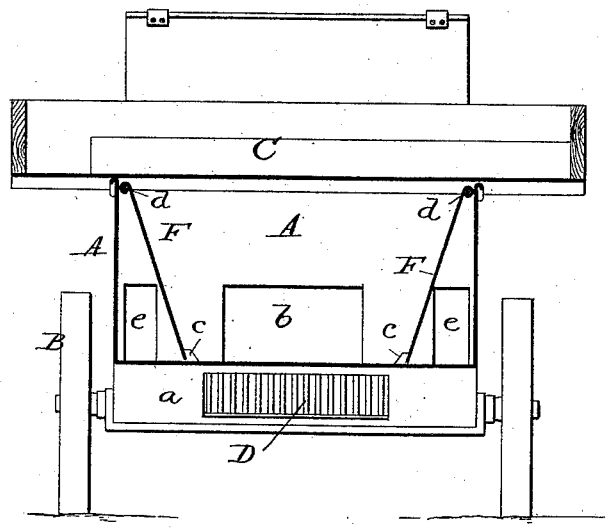

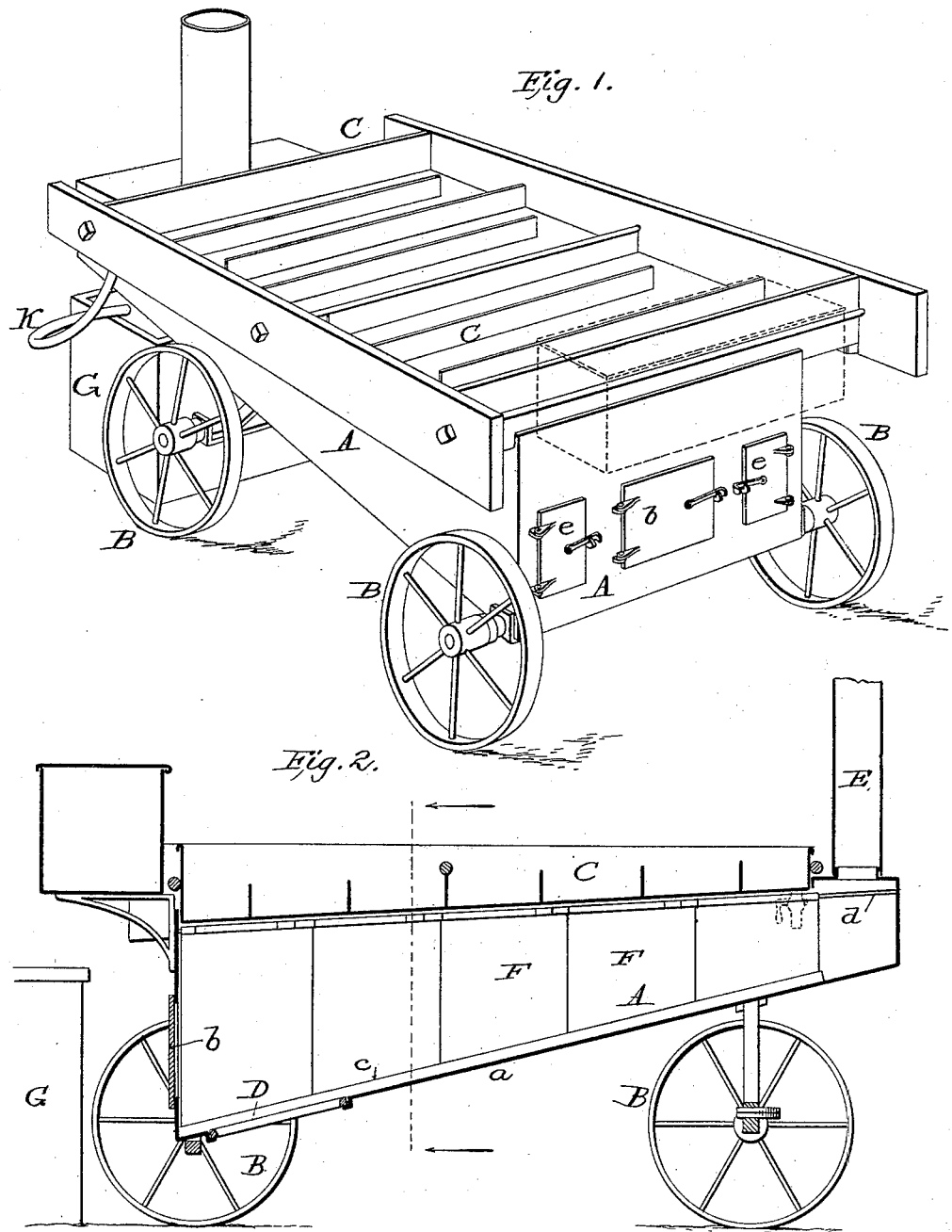

(No Model.) 2 Sheets—Sheet 2.
R. HUFF.
PORTABLE FURNACE.

No. 418,465. Patented Dec. 31, 1889.

Witnesses:
James F. Duhamel.
Horace A. Dodge

Inventor:
Richard Huff,
by Dodge Son,
Attys.

UNITED STATES PATENT OFFICE.

RICHARD HUFF, OF RUSSELLVILLE, MISSOURI.

PORTABLE FURNACE.

SPECIFICATION forming part of Letters Patent No. 418,465, dated December 31, 1889.

Application filed August 1, 1888. Serial No. 281,658. (No model.)

*To all whom it may concern:*

Be it known that I, RICHARD HUFF, of Russellville, in the county of Cole and State of Missouri, have invented certain new and useful Improvements in the Manufacture of Molasses from Sorghum, of which the following is a specification.

My invention relates to a portable evaporating-pan or agricultural boiler; and it consists in various features and details hereinafter set forth and claimed.

In the drawings, Figure 1 is a perspective view of my improved apparatus; Fig. 2, a longitudinal vertical sectional view, and Fig. 3 a transverse sectional view on the line 2 2.

A indicates the body of the boiler, made of any suitable material and mounted upon wheels B, the said body supporting the evaporating-pan C. The bottom $a$ of the body A inclines upward from the rear end, as shown in Fig. 2, and is provided at its lower end with a grate D, while the body A is provided with doors $b$ at its front, by which access may be had to the interior of the body, and at its opposite end with a stack or chimney E, thus forming a portable furnace. Extending lengthwise of the bottom of the body A are cleats $c$, (shown in Figs. 2 and 3,) and extending parallel therewith, near the upper edges of the side walls of the body A, are rods $d$, from which depend inclined reflecting-plates F, which latter rest at their lower ends against the cleats, as clearly shown. The hinges of the plates are so arranged as to permit the latter to overlap one another slightly; and it will be observed, upon reference to Fig. 2, that the plates terminate short of the end of the body A, so as to leave a space for the escape of the air that is behind the plates.

Doors $e$ are applied to the front wall of the body A, and when open permit air to enter the space behind the plates F. By opening or closing these doors $e$ the draft of the furnace may be regulated by admitting more or less air into the space behind the plates and the sides of the body prevented from becoming too hot.

The inclined plates F are designed to throw the heat up toward and against the under side of the evaporating-pan C, which rests upon the upper side of the portable furnace. The pan may be of any desired construction, and will of course be provided with a suitable outlet, as is usual.

The apparatus is designed to be carried from farm to farm to treat the sirup of the different farmers who do not care to go to the expense of purchasing evaporating apparatus; and in order that the said apparatus may be used in connection with the different straining devices G, which will vary, of course, according to the different styles used, I provide the discharge-spout of the pan with a flexible pipe or hose K, as shown in Fig. 1. This hose or pipe is also useful, in that it enables me to direct the sirup into any one of the different divisions of the strainer and thereby avoid handling of the sirup in buckets.

While the apparatus herein shown is designed more particularly for the treatment of sorghum it is equally applicable to the treatment of other substances.

Having thus described my invention, what I claim is—

1. In combination with body A, provided at one end with a grate and at the other end with a smoke-outlet, a series of plates set away from the sides of the body and extending nearly the length of the latter, doors or openings communicating with the air-space behind the plates, and a pan C, resting upon the body A and adapted to form the top of the combustion-chamber.

2. In combination with body A, provided with a grate, a smoke-outlet, and a door $b$, cleats $c$, extending lengthwise of the base of the body, inclined plates set away from the sides of the body and forming an air-space which communicates with the combustion-chamber, doors or openings communicating with said air-space, and a pan C, adapted to form the top of the combustion-chamber.

3. In combination with the wheeled body A, provided at its front end with a grate and a door and at its rear end with a smoke-stack, the plates F F, set away from the sides of the body A, the two sets of plates inclining toward each other at their lower ends and forming air-spaces between the sides of the body and the plates, which communicate at their forward ends with the central combustion-chamber, doors *e e*, communicating with the air-spaces behind the plates, and the pan or cover C, adapted to form a top for the combustion-chamber.

In witness whereof I hereunto set my hand in the presence of two witnesses.

RICHARD HUFF.

Witnesses:
 JOHN HERT, Jr.,
 HUGH L. ENLOE.